(12) United States Patent
Chanda et al.

(10) Patent No.: US 10,834,239 B2
(45) Date of Patent: Nov. 10, 2020

(54) METHOD AND SYSTEM FOR IMPLEMENTING LOGICAL PORT CLASSIFICATIONS

(71) Applicant: Nicira, Inc., Palo Alto, CA (US)

(72) Inventors: Anupam Chanda, San Jose, CA (US); Bryan J. Fulton, San Francisco, CA (US); Teemu Koponen, San Francisco, CA (US)

(73) Assignee: NICIRA, INC., Palo Alto, CA (US)

(*) Notice: Subject to any disclaimer, the term of this patent is extended or adjusted under 35 U.S.C. 154(b) by 104 days.

(21) Appl. No.: 15/900,755

(22) Filed: Feb. 20, 2018

(65) Prior Publication Data

US 2018/0183906 A1 Jun. 28, 2018

Related U.S. Application Data

(63) Continuation of application No. 14/571,260, filed on Dec. 15, 2014, now Pat. No. 9,906,632.

(60) Provisional application No. 62/058,088, filed on Sep. 30, 2014, provisional application No. 62/044,984, filed on Sep. 2, 2014.

(51) Int. Cl.
*G06F 15/173* (2006.01)
*H04L 29/06* (2006.01)
*H04L 29/12* (2006.01)
*H04L 12/24* (2006.01)

(52) U.S. Cl.
CPC .............. *H04L 69/22* (2013.01); *H04L 41/12* (2013.01); *H04L 61/2007* (2013.01); *H04L 61/35* (2013.01)

(58) Field of Classification Search
CPC ..... H04L 69/22; H04L 67/1002; H04L 45/74; H04L 47/10; H04L 47/19; H04L 29/06; H04L 67/02; H04L 2029/06054; H04L 47/2458; H04L 47/2466; H04L 47/25; H04L 63/08; H04L 63/101
See application file for complete search history.

(56) References Cited

U.S. PATENT DOCUMENTS

| | | | |
|---|---|---|---|
| 9,008,080 B1* | 4/2015 | Mehta | ..................... H04L 49/60 370/327 |
| 2004/0017816 A1* | 1/2004 | Ishwar | .................. H04L 12/467 370/395.53 |
| 2006/0248080 A1 | 11/2006 | Gray | |
| 2007/0189288 A1 | 8/2007 | Andrews et al. | |
| 2008/0056156 A1* | 3/2008 | Andrews | ................. H04L 12/66 370/254 |
| 2009/0304007 A1 | 12/2009 | Tanaka | |

(Continued)

*Primary Examiner* — Michael A Keller
*Assistant Examiner* — Thao D Duong
(74) *Attorney, Agent, or Firm* — Adeli LLP

(57) ABSTRACT

The network control system of some embodiments implements logical port classifications to implement different features of logical networks onto a physical network. The network control system of some embodiments modifies flow entries at forwarding elements of the physical network to implement the logical network. The network control system classifies logical source and destination ports into disjoint equivalence classes for logical network flows in a virtualized network, and encodes this information in the tunneled traffic carrying the logical flow. The network control system of some such embodiments provides logical port classifications to minimize the necessary flow entries at each forwarding element of the physical network.

23 Claims, 11 Drawing Sheets

(56) References Cited

U.S. PATENT DOCUMENTS

| | | | |
|---|---|---|---|
| 2010/0106866 A1* | 4/2010 | Aybay | H04L 47/10 710/29 |
| 2012/0120964 A1* | 5/2012 | Koponen | H04L 41/0816 370/409 |
| 2013/0058357 A1 | 3/2013 | Koponen et al. | |
| 2015/0010000 A1 | 1/2015 | Zhang et al. | |
| 2016/0057014 A1* | 2/2016 | Thakkar | G06F 9/45558 709/223 |
| 2016/0065469 A1 | 3/2016 | Chanda et al. | |

* cited by examiner

METHOD AND SYSTEM FOR IMPLEMENTING LOGICAL PORT CLASSIFICATIONS

CLAIM OF BENEFIT TO PRIOR APPLICATIONS

This application is a continuation application of U.S. patent application Ser. No. 14/571,260, filed Dec. 15, 2014, and now published as U.S. Patent Publication 2016/0065469. U.S. Patent Publication 2016/0065469 claims the benefit of U.S. Provisional Patent Application 62/058,088, filed Sep. 30, 2014, and U.S. Provisional Patent Application 62/044,984, filed Sep. 2, 2014. U.S. patent application Ser. No. 14/571,260, now published as U.S. Patent Publication 2016/0065469 and U.S. Provisional Patent Applications 62/058,088 and 62/044,984 are incorporated herein by reference.

BACKGROUND

In computer networking, a switch (a layer 2 broadcast domain) typically consists of several ports. The ports of the switch are important in determining the behavior of the switch in a number of applications (e.g., port isolation, quality of service (QoS), port security groups, etc.). Typically, physical network devices have provided such applications using 802.1PQ tags and DSCP fields in packet headers. Priority code point (PCP) field in the 802.1PQ tag of Ethernet headers are used to encode the priority of the traffic. The PCP field is 3 bits wide; thus, only 7 distinct values may be used in this field. Differentiated service code point (DSCP) uses 6 bits in the IP header to encode the per-hop-behavior of the traffic.

Network virtualization introduces logical forwarding elements and logical ports. Logical forwarding elements are virtualized switches that are implemented using physical switches (e.g., software or hardware switches). With network virtualization, 802.1PQ tags and DSCP fields are inadequate to provide the applications for the logical traffic belonging to several different tenants, because these fields can only classify a limited number of logical flows due to the small number of bits. With such a limited number of distinct values, providing such applications in the physical network devices is infeasible. The sheer number of logical networks belonging to different tenants makes it impossible to encode the logical port classification in the 802.1PQ tag or the DSCP field.

A logical forwarding element may contain far more logical ports than the number of physical ports a typical hardware switch contains. For example, in some embodiments, logical forwarding elements are implemented by software switches that are part of virtualization switches (e.g., hypervisors) in several host machines. The logical forwarding elements connect virtual machines (VMs) that are on the several host machines. The logical forwarding elements may belong to several different tenants that each maintain a set of logical forwarding elements in a logical network on the shared physical resources of the host machines. A single logical forwarding element can span hundreds or thousands of hypervisors that contain at least one physical interface attached to any logical port of the logical forwarding element. Traffic between any two logical ports may potentially traverse through many physical routers and physical switches.

In addition, since physical network devices carry traffic for all logical networks belonging to different tenants, implementing logical flow classification based applications (such as port isolation or QoS) in the physical network devices would not be readily scalable. The existing mechanisms to classify logical flows are inadequate because, as a logical network grows, the amount of network state that is required to implement the logical network increases at an unsustainable rate.

BRIEF SUMMARY

A network control system uses network controllers to implement logical networks onto a physical network. One of the challenges of large networks (including datacenters and enterprise networks) is efficiently implementing port features (e.g., port isolation, port security, etc.) of a logical network onto the physical network. In some embodiments, the network control system implements logical port classification to efficiently implement port features onto a physical network.

The network control system of some embodiments provides controllers that manage forwarding elements of a physical network in order to implement logical port classifications of logical networks onto the physical network. In some embodiments, the network control system modifies forwarding rules of forwarding elements of the physical network to implement the logical network. The network control system uses port group identifiers to classify logical source and/or destination ports into disjoint groups, or equivalence classes, for logical network flows in a virtualized network. The ports in some embodiments are classified based on properties of the port, properties of a device connected to the port, characteristics of a user associated with the device, etc. The network control system encodes the port group identifiers in the tunneled traffic carrying the logical flow. The network control system of some such embodiments provides logical port classifications to minimize the number of necessary forwarding rules at each forwarding element of the physical network.

In some embodiments, a controller of the network control system receives a set of logical port group identifiers. The logical port group identifiers classify the logical ports of a logical network into different classifications, or groups. The controller translates the logical port group identifiers into instructions to implement the logical port groups for managed forwarding elements of the network control system. The controller of some embodiments generates instructions (1) to assign logical port group identifiers to packets received at physical ports of the managed forwarding elements and (2) to forward the packets through the physical network based on the logical port group identifiers. The controller then propagates the instructions to the managed forwarding elements to implement the logical port groups of the logical network.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
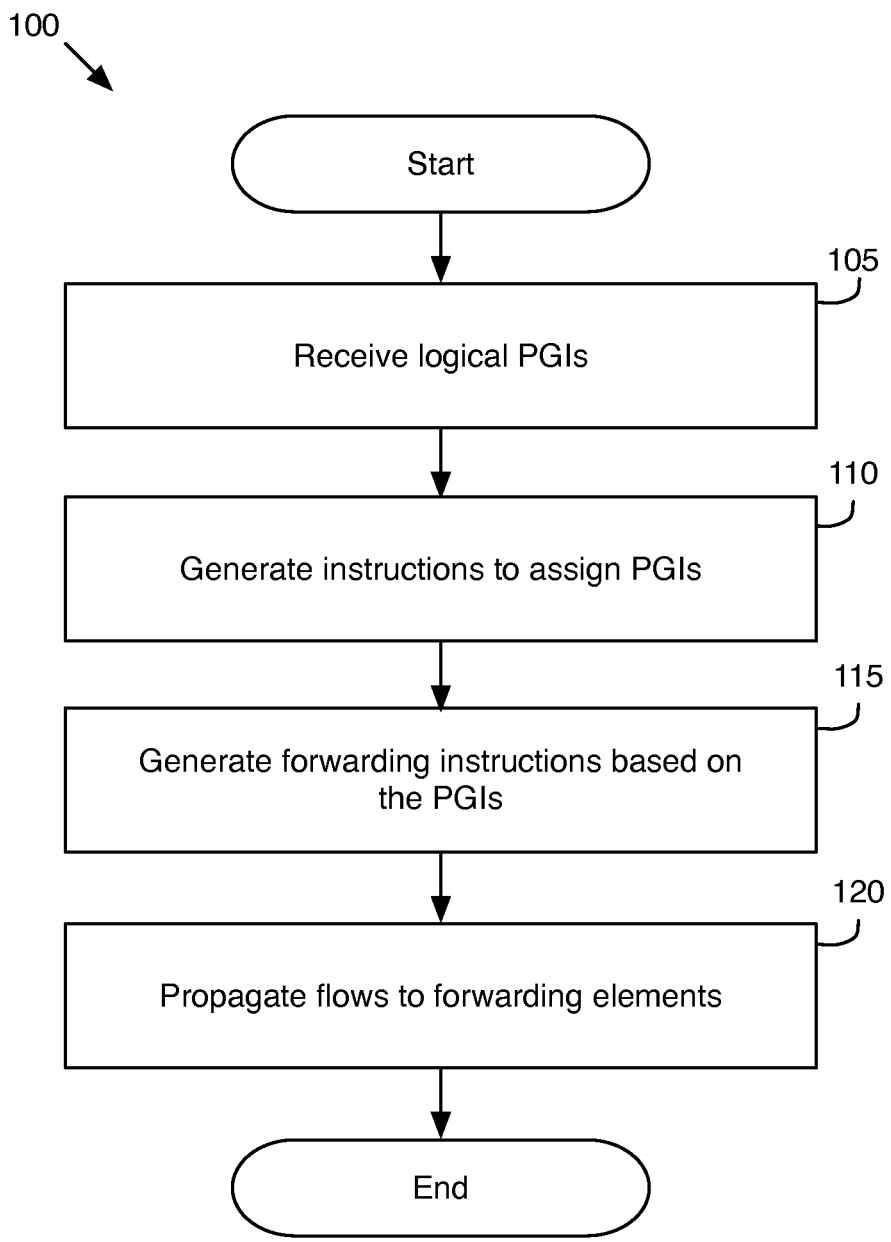
FIG. 1 conceptually illustrates a process of some embodiments for implementing logical port groups for a logical network onto a physical network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

A network control system uses network controllers to implement logical networks onto a physical network. One of the challenges of large networks (including datacenters and enterprise networks) is efficiently implementing port features (e.g., port isolation, port security, etc.) of a logical network onto the physical network. In some embodiments, the network control system implements logical port classification to efficiently implement port features onto a physical network.

The network control system of some embodiments provides controllers that manage forwarding elements of a physical network in order to implement logical port classifications of logical networks onto the physical network. In some embodiments, the network control system modifies forwarding rules of forwarding elements of the physical network to implement the logical network. The network control system uses port group identifiers to classify logical source and/or destination ports into disjoint groups, or equivalence classes, for logical network flows in a virtualized network. The ports in some embodiments are classified based on properties of the port, properties of a device connected to the port, characteristics of a user associated with the device, etc. The network control system encodes the port group identifiers in the tunneled traffic carrying the logical flow. The network control system of some such embodiments provides logical port classifications to minimize the number of necessary forwarding rules at each forwarding element of the physical network.

In some embodiments, a controller of the network control system receives a set of logical port group identifiers. The logical port group identifiers classify the logical ports of a logical network into different classifications, or groups. The controller translates the logical port group identifiers into instructions to implement the logical port groups for managed forwarding elements of the network control system. The controller of some embodiments generates instructions (1) to assign logical port group identifiers to packets received at physical ports of the managed forwarding elements and (2) to forward the packets through the physical network based on the logical port group identifiers. The controller then propagates the instructions to the managed forwarding elements to implement the logical port groups of the logical network.

In some implementations of logical networks, applications such as port isolation and port security are performed using forwarding rules that define actions for every possible source-destination combination by matching rules based on packet header data (e.g., source/destination MAC, source/destination IP address, etc.). However, logical networks may include thousands of ports to thousands of machines for several different tenants. As the logical networks expand, the number of rules increases, making for unruly implementation.

FIG. 1 conceptually illustrates a process of some embodiments for implementing logical port groups for a logical network onto a physical network. In some embodiments, the process 100 is performed by controllers in the network control system that manage a set of forwarding elements.

The process receives (at 105) logical port group identifiers (PGIs). In some embodiments, the logical PGIs are received from a tenant in a multi-tenant datacenter. The logical PGIs classify the logical ports of a logical forwarding element (e.g., a logical switch, a logical router, etc.) of a logical network, allowing the managed forwarding elements that implement the logical forwarding element to process and forward network data based on the classification or group of the source and/or destination ports.

In order to assign the packets to the different equivalence classes, the process 100 generates (at 110) a set of instructions to assign the logical port group identifiers to packets of the different equivalence classes by modifying bits in the headers of the packets.

In some embodiments, the set of instructions include flow entries for a flow-based software switch, such as Open vSwitch (OVS). A flow entry contains a rule for deciding what to do with a unit of network information (e.g., a packet) when that unit arrives at a forwarding element. The forwarding element of some embodiments matches information in the packet to a set of flow entries stored in a set of forwarding tables of the forwarding element. Each flow entry indicates a criteria for matching against packet information, as well as a forwarding action (e.g., forwarding to a specific port, modifying the packet header, etc.) for forwarding each packet that matches the criteria through the forwarding elements.

In some embodiments, the process 100 generates (at 110) a set of instructions to assign a source PGI based on the port on which the network data is received or on data associated with a packet (e.g., source MAC, source IP, etc.). Alternatively or conjunctively, the process 100 generates (at 110) a set of instructions to assign a destination PGI based on a destination address for a packet.

Typically, in a virtualized network environment the logical traffic is encapsulated using tunnel headers capable of carrying metadata. The tunnel headers are sometimes referred to as tunnel keys. In some embodiments, portions of the tunnel key are used to send the source port group identifier and the destination port group identifier through the network. For most applications, the number of distinct port group identifiers is small. By reducing the amount of state required to implement the functions of the different applications, the network control system is able to scale with a logical network as the logical networks grow larger.

In addition to the set of instructions for assigning the packet to the different equivalence classes, the process 100 also generates (at 115) another set of instructions that perform forwarding for received packets based on the assigned port group identifiers. The forwarding rules of some embodiments include rules for sending packets to particular ports and along tunnels, as well as implementing a set of access control lists (ACLs) that control access to the logical forwarding element for specific machines, ports, users, applications, etc. ACLs can be implemented at an ingress or egress port to control access into or out of a logical forwarding element.

Once the process 100 has generated the sets of instructions, the process 100 propagates (at 120) the instructions to the physical managed forwarding elements that implement the logical network element. The physical managed forwarding elements then use the instructions to implement the logical network based on the generated instructions. The process 100 then ends.

Details and examples of applications of logical port classifications in a network control system are described below. Specifically, Section I describes the use of logical port classifications to implement port isolation. Section II describes the use of logical port classifications to implement port security in a network control system. Finally, Section III describes computer systems and processes used to implement some embodiments of the invention.

I. Port Isolation

Private VLANs (PVLANs) provide port isolation in a physical network. Typically, PVLAN is implemented using the VLAN field in the network header to classify the flow. Isolated ports in a PVLAN may not communicate with other isolated ports belonging to the PVLAN. Uplink ports in a PVLAN are allowed to communicate with isolated ports and other uplink ports. However, it is not straightforward to provide port isolation in a virtualized network environment using PVLANs. Current solutions do not provide good scaling properties for port isolation in a virtualized network environment.

A typical port isolation implementation in a virtualized network environment does not scale well as the size and complexity of the virtualized network environment increases. For example, assume a logical forwarding element with n logical ports. A small number, k, of these logical ports are uplink ports. The other n-k ports are isolated ports. In order to implement port isolation among the n-k isolated ports, the network controller of a typical port isolation implementation needs to compute state proportional to n-k in order to deny network traffic between any source MAC address and a given destination MAC address for the isolated logical ports. Specifically, the network controller needs to compute an instruction to drop traffic from each of the n-k isolated ports to each of the n-k ports. Thus, for all n-k logical ports, the state requirement is $O((n-k)^2)$, or simply $O(n^2)$ since k is considered a constant.

The network control system of some embodiments provides a scalable solution to implement port isolation in a virtualized network environment without modifying the physical network's core networking elements. For a given logical forwarding element, a fixed amount of state is maintained at managed forwarding elements (MFEs) at the edge of a network (i.e., the forwarding elements that include the physical ports that correspond to the logical ports of the logical forwarding element) to implement port isolation. Because the amount of state is fixed, the solution is able to scale with the number of ports in the logical forwarding element, i.e., the amount of state required does not increase with the number of ports.

In this example, there are n MFEs with each MFE having exactly one physical interface corresponding to a logical port of this logical forwarding element. Thus, the span of this logical forwarding element includes all the n MFEs. However, multiple physical interfaces could be on the same MFE.

In a virtualized network environment, the network controller classifies each logical port as an isolated port or an uplink port, and encodes this information in each packet that is sent or received across each logical port. The encoding can be carried over the physical network overlay that is typically used to provide encapsulation (e.g., using the GRE tunneling protocol, stateless transport tunneling (STT) protocol, or any other tunneling protocol) of the logical network traffic. In some embodiments, the source of the packets is encoded in the headers of the packets as the source port group identifier (SPGI). The SPGI may have one of a constant number of values. For example, in the case of port isolation, two values are possible: an isolated port group, and an uplink port group. The SPGI for the two port groups can be encoded using only a single bit for port isolation. If there are more port groups, additional bits can be used to encode the different groups.

Figure 2A:
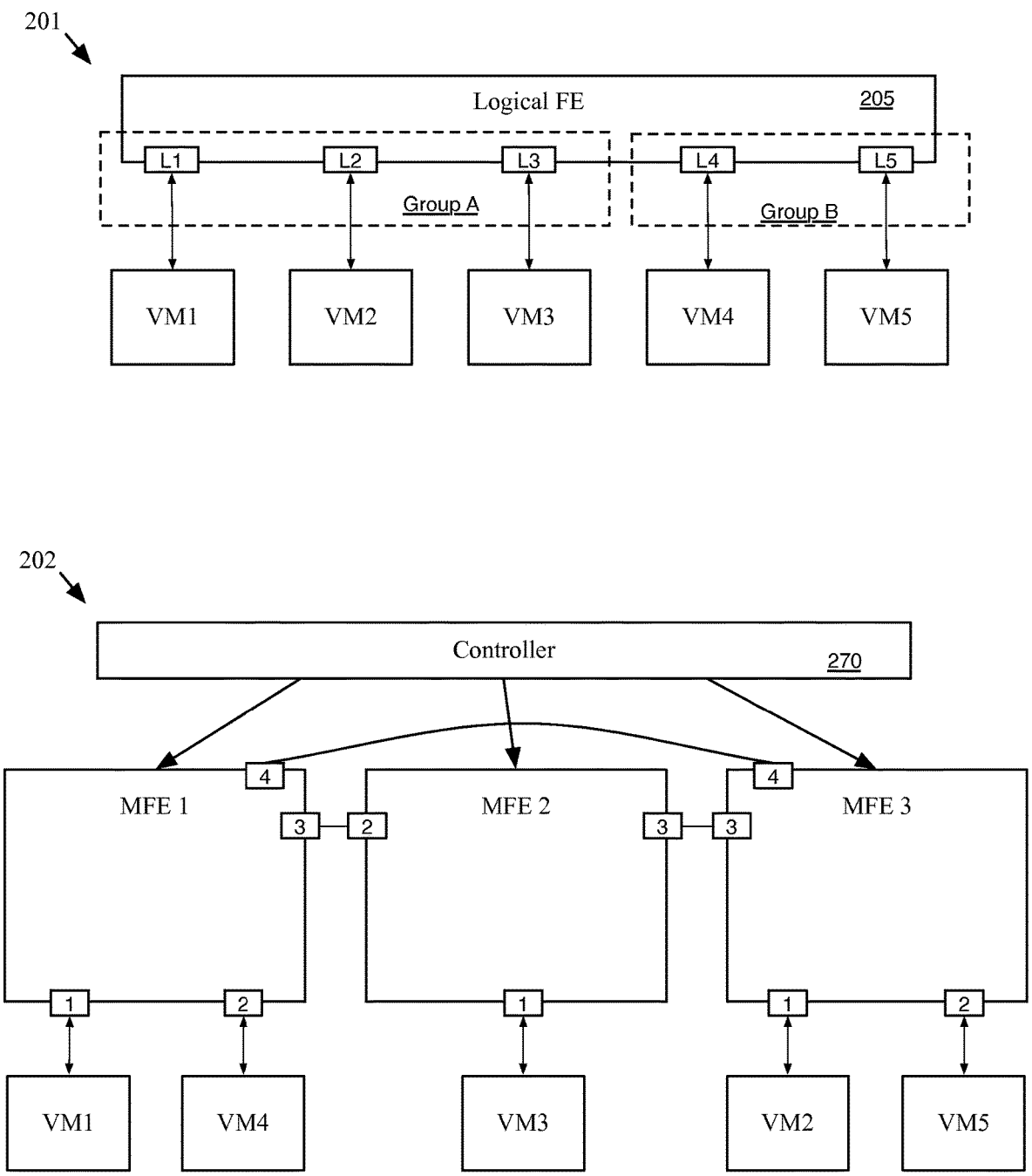
FIGS. 2A-B illustrate an example of an implementation of logical port groups for a logical network onto a physical network.
Figure 2B:
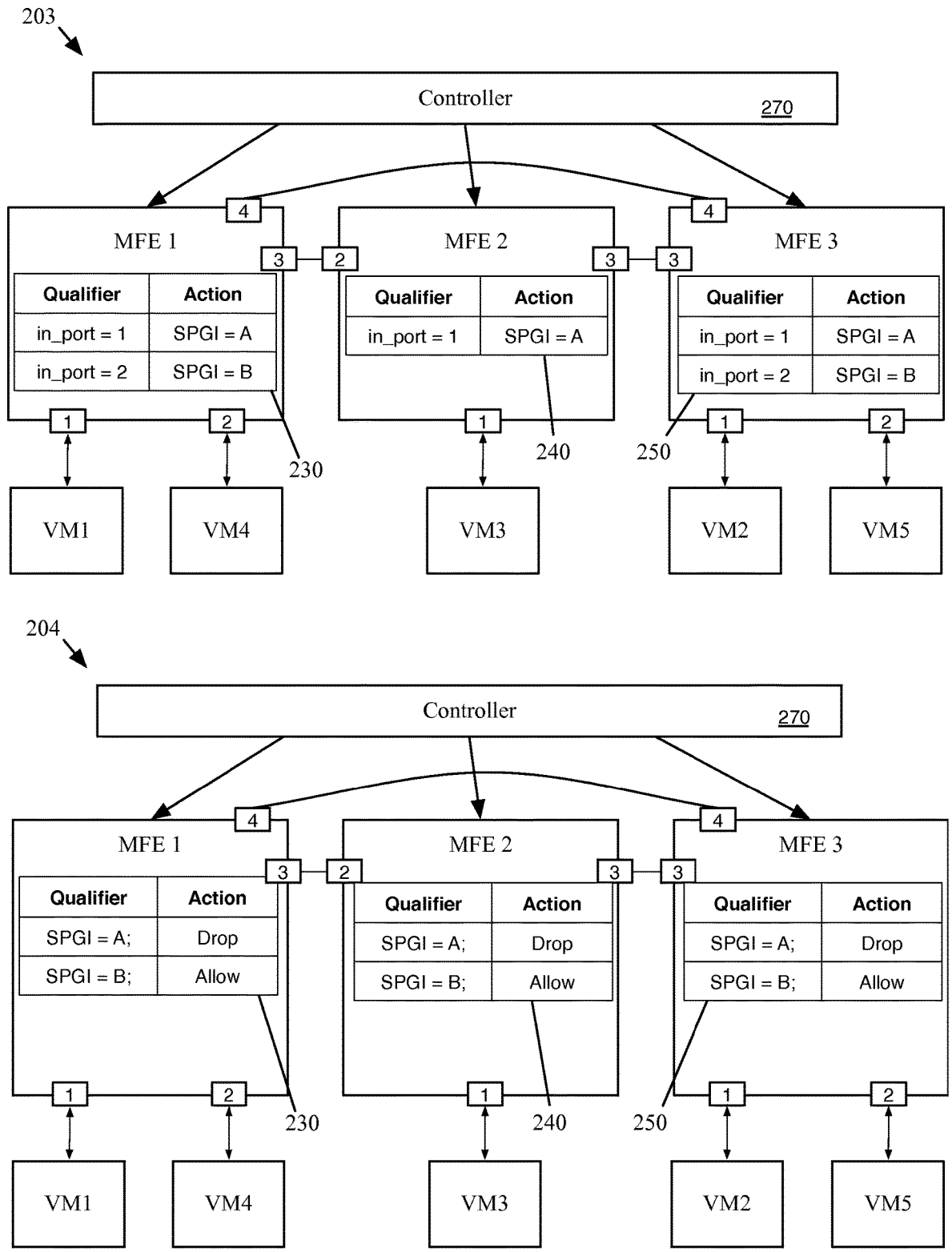

FIGS. 2A-B illustrate an example of an implementation of logical port groups for a logical network onto a physical network with four views 201-204. The logical first view 201 conceptually illustrates a logical forwarding element. The logical forwarding element 205 of some embodiments is a logical forwarding element that is defined by a particular tenant in a datacenter. The datacenter may implement multiple logical forwarding elements for multiple tenants on a shared set of physical devices.

The logical first view 201 conceptually illustrates a representation of a logical network. In this figure, the logical network includes a logical forwarding element 205 and VMs 1-5 connected to the logical forwarding element 205 through logical ports L1-L5. The logical ports L1-L3 for VMs 1-3 are classified as Group A, while logical ports L4 and L5 for VMs 4 and 5 are classified as Group B. These groups can be used for many different types of classifications. For example, in port isolation, group A could represent the isolated ports while group B represents the uplink ports. In some embodiments, uplink ports are used for ports to gateways out of the logical network, rather than to other VMs in the logical network.

The physical second view 202 illustrates the implementation of the logical forwarding element 205 on a set of physical managed forwarding elements (MFEs) 1-3 (e.g., software/hardware switches, routers, etc.). The second view 202 illustrates a controller 270, managed forwarding elements (MFEs) 1-3, and VMs 1-5.

The controller 270 implements the logical forwarding element 205 by controlling, or managing, the MFEs 1-3. The controller 270 in some embodiments is a cluster of controllers that generate network state data to implement the logical network and propagate the generated network state data to the MFEs 1-3. In some embodiments, the generated network state data defines a set of forwarding rules for the MFEs 1-3 such that the packets forwarded in the physical network behave according to the logical definition of the logical network.

MFE 1 is a managed forwarding element that is connected to two VMs, VM 1 and VM 4 on ports 1 and 2 respectively. MFE 1 also includes ports 3 and 4, which connect to the other managed forwarding elements (i.e., port 2 of MFE 2 and port 4 of MFE 3). Similarly, MFE 2 has a VM 3 connected to port 1 of MFE 2 and external ports 2 and 3 that connect to the ports of the other MFEs. Likewise, MFE 3 connects to VM 2 and VM 5 on ports 1 and 2 and connects to MFEs 2 and 1 on ports 3 and 4 respectively.

As shown, the configuration of the logical forwarding element 205 does not correspond to the implementation of the logical forwarding element 205 on the physical MFEs 1-3. In this example, the logical forwarding element 205 has three VMs 1-3 connected to three ports L1-L3 in Group A. In the physical second view 202, VMs 1-3 are not connected to a single forwarding element, but rather are connected to physical ports on three separate MFEs 1-3. Likewise, VMs 4 and 5 of Group B are located on MFEs 1 and 2. The controller 270 of some embodiments manages the physical network to allow the configuration of logical network elements to be completely separated from the arrangement of the VMs and the MFEs in the physical network.

The physical third view 203 illustrates a view of the physical network with flow entries for assigning PGIs. In the third view 203, MFEs 1-3 have forwarding tables 230, 240, and 250 respectively. The forwarding tables 230, 240, and 250 are each populated with records for assigning PGIs to packets at the MFEs. In some embodiments, each of the records specifies operations for routing network data based on routing criteria. The records may be referred to as flow entries in some embodiments as the records control the "flow" of data through the forwarding elements. Although this example is shown with a single forwarding table for each MFE, in some embodiments, each MFE may have several different forwarding tables to perform different functions. For example, in some embodiments, an MFE has separate forwarding tables to perform logical ingress ACLs, L2 forwarding, and logical egress ACLs for network data. Furthermore, as the MFE may implement multiple LFEs, the MFE may have separate tables for the different LFEs.

MFE 1 has one record for each port that is connected to a VM of the logical forwarding element. The first flow entry has a qualifier that identifies when a packet is received on port 1. The associated action sets the SPGI to A because VM1 of the logical forwarding element 205 is in Group A. The qualifier for the second flow entry identifies any packet received on port 2 (i.e., from VM4). The second flow entry sets the SPGI to B because VM4, which is connected to physical port 2 of MFE 1, is in Group B in the logical forwarding element 205. Similarly, MFE 2 matches the packets to flow entries 240 and sets the SPGI for packets received on port 1 from VM3 to Group A. MFE 3 matches packets to flow entries 250 and sets the SPGI for packets received on port 1 from VM2 to Group A and those received on port 2 from VM 5 to Group B.

Each of the MFEs 1-3 have flow entries for assigning the source port group identifier (SPGI) based on the incoming port (in port) for the packet. MFE1 has flow entries that assign SPGI to A when a packet is received on port 1, and assign SPGI to B when a packet is received on port 2. The flow entries of some embodiments assign the port group identifiers by storing a PGI in a register in memory for each packet, based on the logical description of the logical forwarding element. Then, once forwarding decisions for the packet have been made and the packet has a tunnel key, the flow entries write the stored PGI to the tunnel key of the packet, before the packet is forwarded out of the MFE.

The physical fourth view 204 illustrates a view of the physical network with flow entries for forwarding packets based on the assigned PGIs. In some applications, such as port isolation, the forwarding of the packets includes performing access control to drop or allow packets. The forwarding tables 230, 240, and 250 are each populated with different flow entries for forwarding packets based on the assigned PGIs. In some embodiments the flows are located in the same forwarding table as the flows for assigning the PGIs, while in other embodiments the flows are in different forwarding tables.

Each of the forwarding tables 230, 240, and 250 for the MFEs 1-3 store the same records for forwarding a packet based on the SPGI of a packet. Logical port classification allows the network state for implementing the forwarding logic to remain largely constant. As new ports are added or removed, new flow entries simply need flow entries to assign PGIs to the packets.

Figure 3:
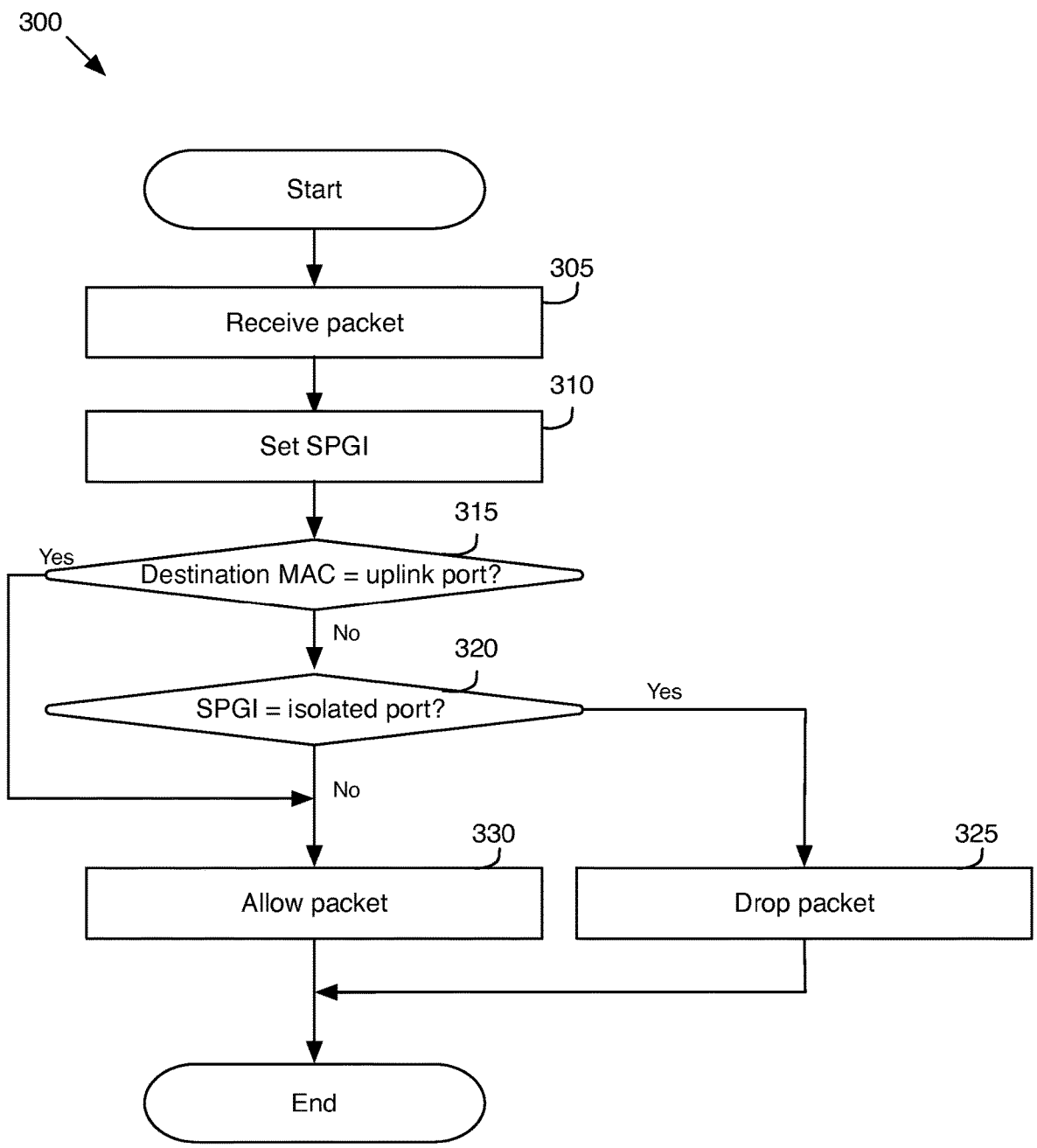
FIG. 3 conceptually illustrates a process of some embodiments for implementing port isolation using logical port classifications.
Figure 4:
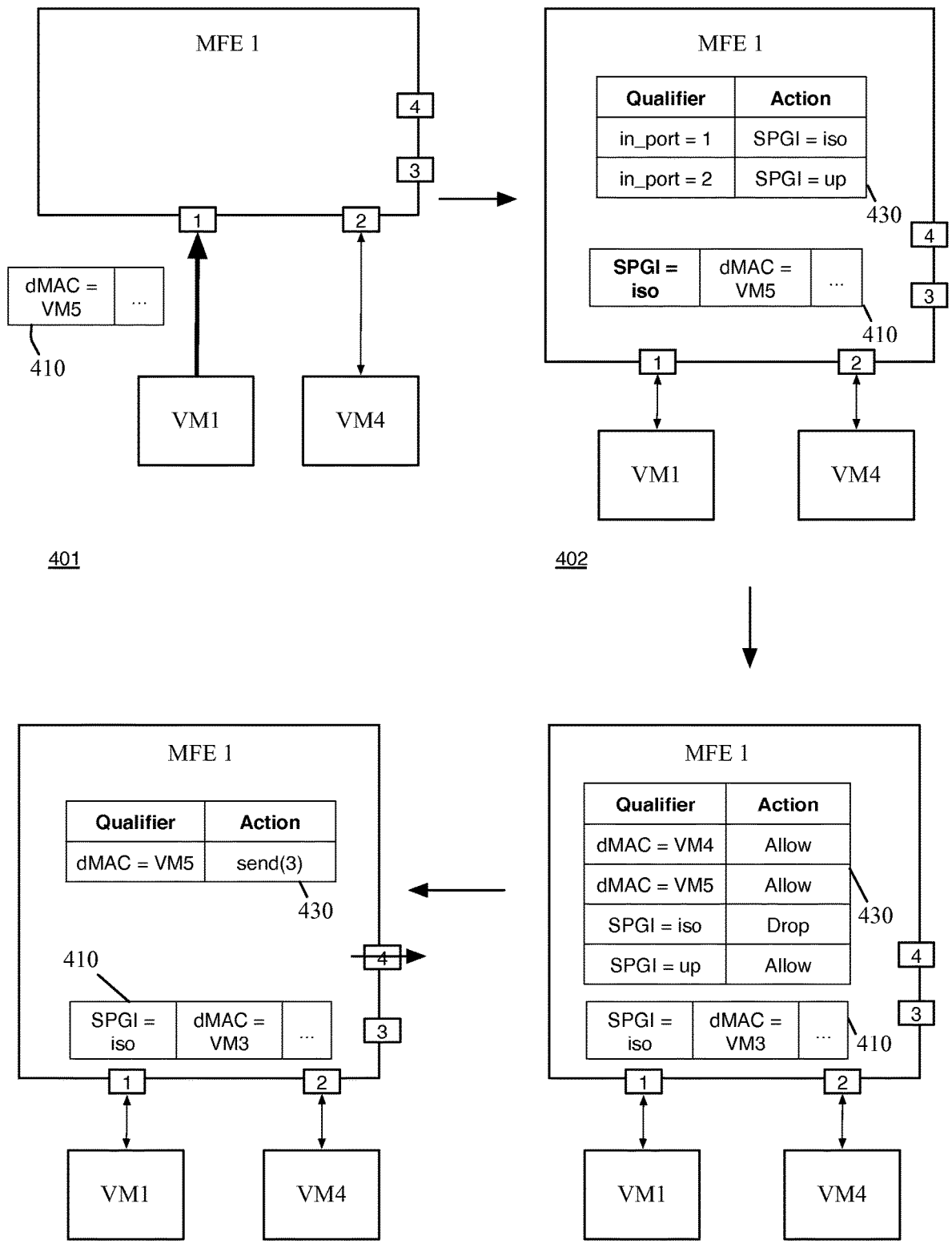
FIG. 4 illustrates an example of performing logical port classifications at an ingress port.

FIG. 3 conceptually illustrates a process of some embodiments for implementing port isolation using logical port classifications. The process 300 of FIG. 3 of some embodiments is performed by an MFE that implements a portion of a logical network. The process 300 will be described with reference to the example of FIG. 4, based on the logical forwarding element 205 and the physical network as described in FIG. 2. FIG. 4 illustrates an example of performing logical port classifications at an ingress port in four stages 401-404.

The process 300 receives (at 305) a packet at a particular port. The first stage 401 of FIG. 4 illustrates MFE 1, as described above in FIG. 2. MFE 1 is connected to VMs 1 and 4 on ports 1 and 2 respectively. MFE 1 is also connected to other MFEs (not shown) through ports 3 and 4. The first stage 401 also shows a packet 410 that is received from VM1 on port 1 of MFE 1. The header of packet 410 may include various network data.

The header of a packet in some embodiments includes data for forwarding the packet in the network (e.g., source/destination MAC address, source/destination IP address, etc.). In particular, the header of packet 410 shows that the destination MAC address for the packet is VM5. The destination MAC address is a MAC address in the standard form of a 48-bit MAC address, but is shown as "VM 5" for simplicity. In this example, VM 5 is connected to another MFE (not shown) through port 4.

The process 300 then sets (at 310) a source port group identifier (SPGI) for the packet. The SPGI identifies a classification for the port on which the packet is received. In some embodiments, the process sets the SPGI by identifying a flow entry based on an ID for the particular port and encoding a SPGI in the overlay tunnel key.

In the second stage 402 of FIG. 4, the packet 410 is processed by a first set of flow entries in the forwarding table 430. The first set of flow entries of some embodiments assigns a SPGI for the packet based on the port on which the packet is received. The second stage 402 shows that the SPGI for the packet 410 is set to "iso" to indicate that the packet 410 was received from a machine in the isolated port group. The SPGIs are illustrated here with group names, "iso" and "up", to simplify the explanation of the figure, but the actual values of SPGIs would be a numeric value to be stored in a register before being written to a set of bits in a tunnel key.

Once the SPGI is encoded in the overlay tunnel key (i.e., after the forwarding decisions for the packet have been made), the packet is processed by a set of flows for forwarding the packet and implementing the port isolation. In port isolation, any traffic that is destined for an uplink port is allowed, whether the source is an isolated port or an uplink port. So, the process 300 determines (at 315) whether the destination MAC for the packet is that of an uplink port. When the process 300 determines (at 315) that the destination MAC is that of an uplink port, the process continues to operation 330 and allows (at 330) the packet to continue to be processed. Operation 330 will be described in further detail below.

The third stage 403 illustrates the packet 410 being processed by a second set of flow entries in the forwarding table 415. The second set of flow entries of some embodiments describe rules for forwarding a packet based on the assigned port group identifiers. In this example, the forwarding table 415 has four flow entries. The first two entries in the forwarding table 430 allow any packet that is destined for a port in the uplink port group. In this example, the determination is based on the destination MAC of the packet. In some embodiments, the determination is based on a destination PGI or destination IP address.

As described above, generating the necessary state using port group identifiers allows for much smaller state requirements. For example, the state required to determine (at 315) whether the destination MAC is an uplink port requires constant state for each uplink port, so total state is proportional to k (where k is the number of uplink ports). In the example flow entries of the third stage 403, the allow and drop decisions are all made at the initial MFE (MFE 1) that receives the packet, so MFE 1 needs a flow entry for each VM in the uplink port group to know whether to drop or allow a packet for a particular destination. This results in a total of k flow entries on each of the MFEs.

In some embodiments, rather than performing all of the decisions at the initial MFE, determining whether the destination MAC is an uplink port is not performed until the packet exits the logical forwarding element at an egress port of the MFE that is connected to the machine with the destination MAC. In such embodiments, each MFE only needs flow entries to check the destination MAC for uplink ports that are directly connected to the particular MFE. In the example of stage 403 of FIG. 4, the forwarding table 430 would not have a flow entry checking for a destination MAC for VM5. The packet 410 would be allowed or dropped based on the SPGI, and forwarded to another MFE that would determine whether the destination MAC was in the uplink port group. In such embodiments, the system would only require a total of k flow entries. An example of performing some of the decisions at the egress port is described below with reference to FIG. 5.

When the process 300 determines (at 315) that the destination MAC is not an uplink port (i.e., that the destination port is an isolated port), the process determines (at 320) whether the source port group identifier is in the isolated port group. When the process determines (at 320) that the source port group identifier is in the isolated port group, then the process 300 drops (at 325) the traffic. When the process 300 determines (at 320) that the source port does not belong to the isolated port group (i.e., is in the uplink port group), then the process 300 allows (at 330) the packet.

The third stage 403 of FIG. 4 further shows third and fourth entries in the forwarding table 430 that drop any packets where the SPGI is "iso" and allow any packets where the SPGI is "up." This drops any traffic between any two isolated ports and allows traffic from any uplink port to an isolated port. The third and fourth entries would be the same on each of the MFEs in the system and would not change unless the port groups were modified.

Determining whether to allow or drop the packet 410 based on the SPGI requires constant state on each MFE. Rather than having individual flow entries that determine whether to allow or drop a packet for every combination of ports, the second and third flow entries show that only two flow entries are needed on each of the MFEs 1-3, in addition to the k flow entries across the MFEs, to implement port isolation. Therefore, total state is proportional to n and the total state in all the MFEs taken together is O(n). The state requirement increases linearly with the number of logical ports in the system. Thus, it has good scaling properties as opposed to the O(n^2) solution that requires enumeration of all source ports for a given destination port in order to allow or deny the traffic.

In some embodiments, once the packet is allowed (at 330), the packet is processed by additional flow entries that forward the packet through the network. The fourth stage 404 illustrates a third set of flows for forwarding the packet once the process determines to allow the packet 410. The flow entry in the forwarding table 430 shows that MFE 1 will forward the packet on port 4 because the destination MAC is for VM5, which is located on another MFE.

Figure 5:
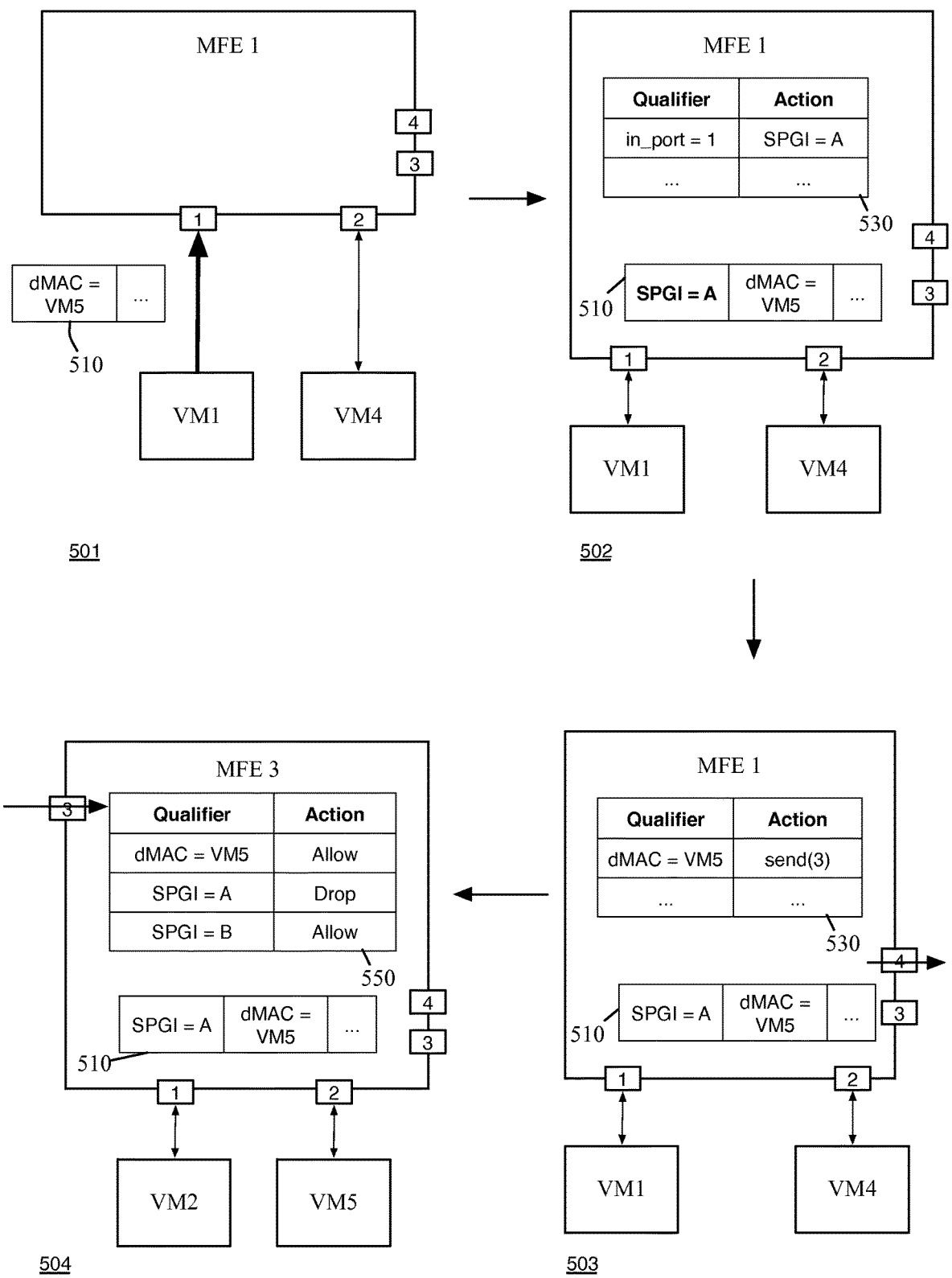
FIG. 5 illustrates an example of performing logical port classifications at an egress port.

In some embodiments, rather than performing all of the forwarding decisions at an ingress port of a first MFE, some forwarding decisions are not made until a packet reaches an egress port of an MFE to exit the logical forwarding element. FIG. 5 illustrates an example of performing logical port classifications at an egress port. The first two stages 501 and 502 are the same as the first stages of FIG. 4. However, in the third stage 503, rather than determining whether to drop or allow the different packets, the packet 510 is sent out along port 4 to MFE 3 with the SPGI encoded in the tunnel key. MFE 3 is the MFE that is connected to the destination VM 5. In the fourth stage 504, MFE 3 receives the packet 510 and performs the forwarding decisions based on the assigned PGIs which are extracted from the tunnel key. In some embodiments, some of the forwarding decisions are performed at the egress port because the classification of the destination port of the packet or the access allowed for the packet are not known until the packet reaches the destination MFE.

II. Port Security

The base case of security profiles includes ingress/egress ACLS and a "security profiles enabled" vs "security profiles not enabled" classification in some embodiments. A security profile contains two lists (One for ingress and one for egress) of whitelist "security rules" specifying ethertype (IPv4/IPv6), source/destination IP prefix, protocol, and port range (or singleton). A logical port uses one or more security profiles and is considered to be a "member" of that profile in some embodiments.

The controller of the network control system determines if the logical port, has security profiles enabled with ingress security rules matching ethertype, destination IP prefix, protocol, and port range. If security profiles are enabled, the controller creates a flow entry in the ingress ACL stage of the pipeline to allow traffic matching the specific fields for every rule of the security profile. The controller also adds a flow entry to drop all other traffic for the logical port. When security profiles are not enabled, the controller creates a flow in the ingress ACL stage of the pipeline to allow all traffic, regardless of type.

The controller then determines whether the logical port has security profiles enabled with egress security rules matching ethertype, source IP prefix, protocol, and port range. Like the ingress security rules, the controller creates a flow in the egress ACL stage of the pipeline to allow traffic matching the specific fields for every rule of the security profile when security profiles are enabled and creates a flow in the ingress ACL stage of the pipeline to allow all traffic, regardless of type when the security profiles are not enabled.

In some embodiments, more complicated security profiles are implemented using logical port classification. Each security profile has an ID and contains ingress/egress rules. The rules can specify source/destination addresses to match on, or can specify source/destination ports that have a particular profile. Referential rules for a security profile match on addresses or ports of a different group. For example, a referential egress rule may allow all TCP traffic from members of the webserver group to members of the database group. Self-referential rules for a particular group match on ports that are members of the same particular group. For example, a self-referential egress rule may allow all members of the oracle profile to SSH into each other.

Figure 6A:
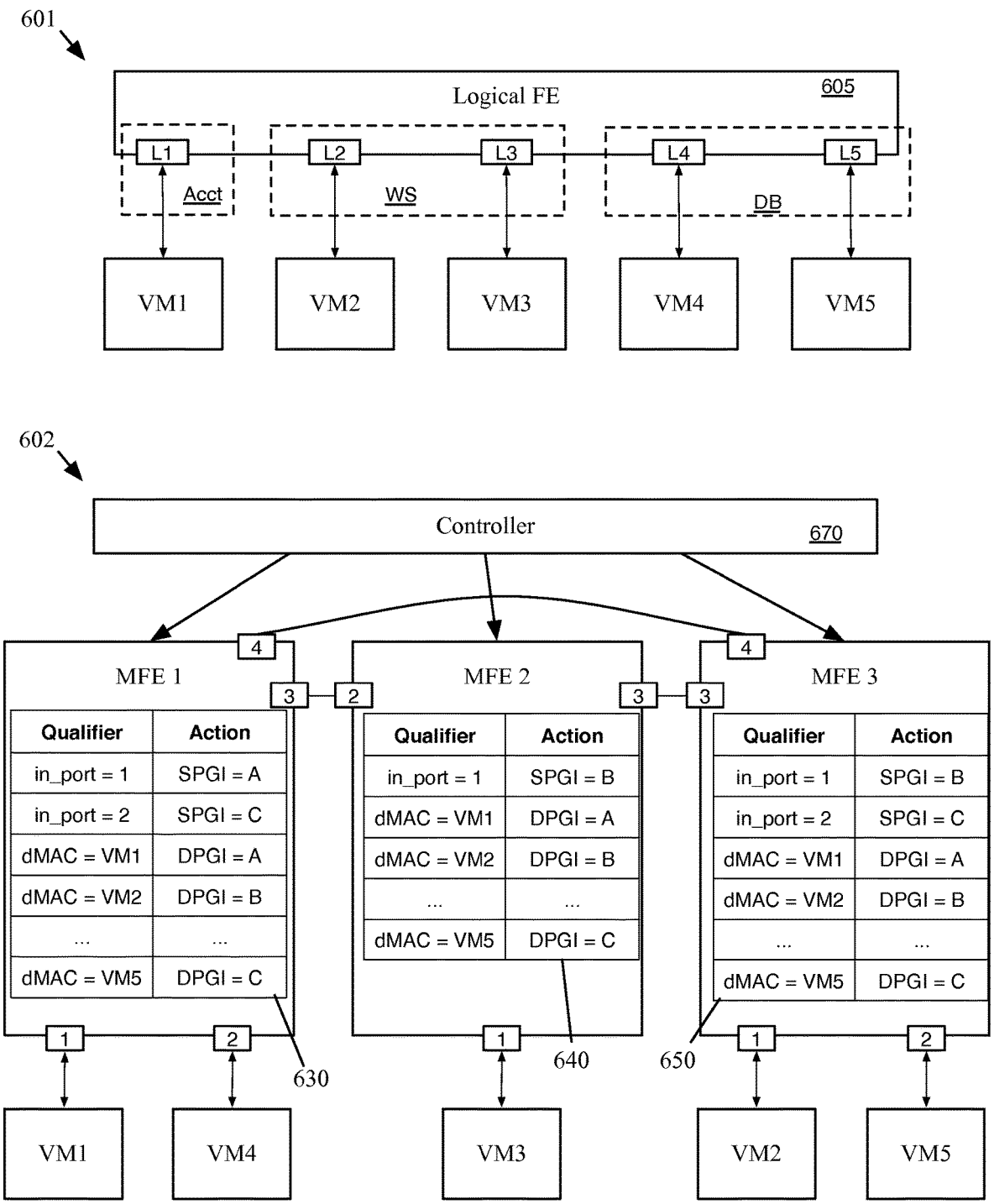
FIGS. 6A-B illustrate an example of an implementation of port security for a logical network onto a physical network.
Figure 6B:
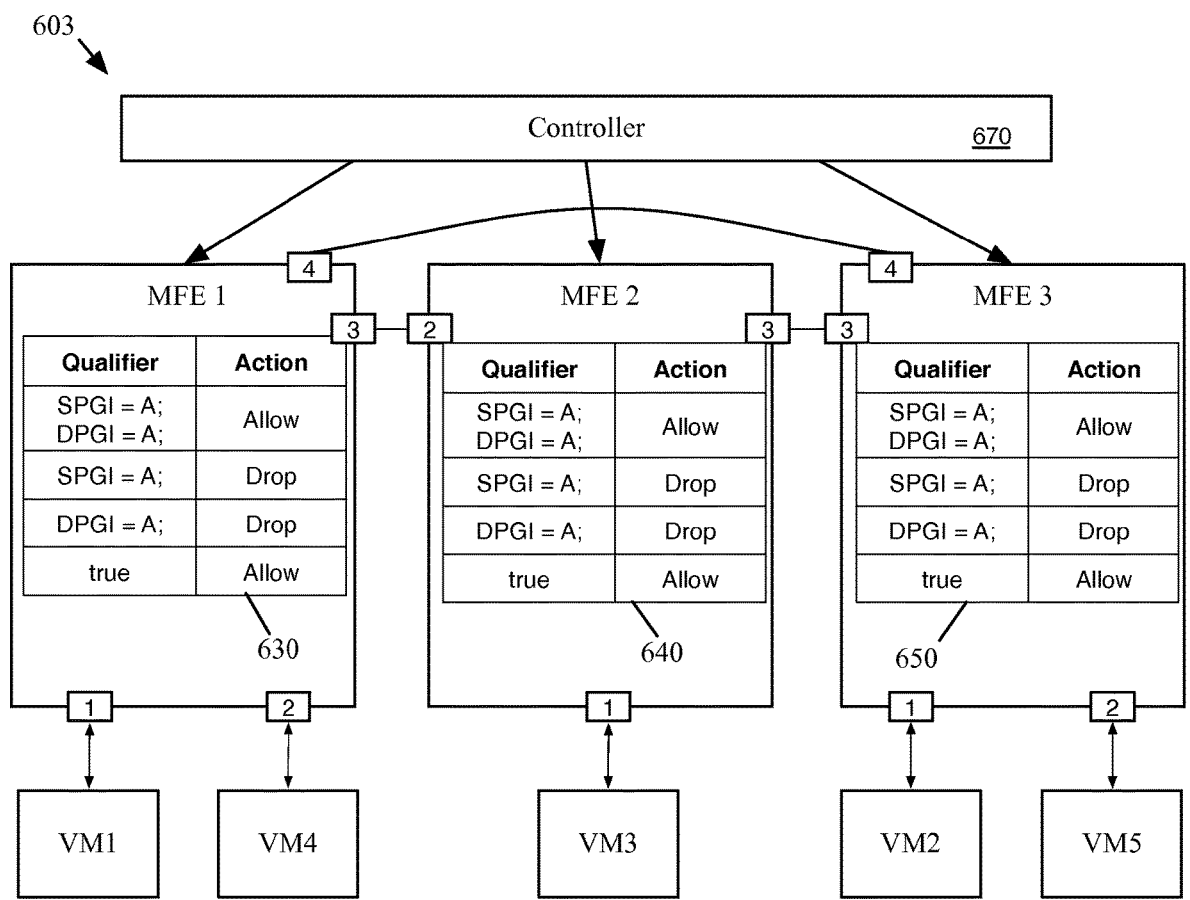

FIGS. 6A-B illustrate an example of an implementation of referential rules in port security for a logical network onto a physical network. FIGS. 6A-B is similar to the example described with reference to FIGS. 2A-B. However, unlike FIGS. 2A-B, the logical first view 601 of FIGS. 6A-B illustrates that the ports L1-L5 of logical forwarding element 605 are divided into three groups for accounting, webservers, and database servers. The security profile for the logical forwarding element uses referential rules to control traffic between the different ports. In this example, ports in the accounting group are not allowed to communicate with the other groups, while ports in the webserver and database groups can communicate with each other.

Some current implementations of port security groups explode every referential rule into a group of singleton IPs for all the members of the different security groups. For example, a particular security profile allows TCP traffic from ports belonging to the X members of the webserver group to ports belonging to the Y members of the database group of the logical forwarding element 605. Some current implementations will create flow entries in the egress ACL for each and every member of the webserver group to allow TCP traffic to the IP address of every member of the database group. This does not scale well because this requires Y flow entries (allow traffic from all members of webserver profile) for every logical port X (all members of database profile).

With logical port classification, the profile information is encoded using PGIs that are stored in the tunnel header. A small number of bits of the tunnel header are used to encode the number of profiles used in these referential rules of the logical forwarding element. Referring back to the example of FIG. 6, the physical second view 602 illustrates MFE 1 with a forwarding table 630, MFE 2 with forwarding table 640, and MFE3 with forwarding table 650. The forwarding tables 630, 640, and 650, like the forwarding tables of FIG. 2, have sets of flow entries generated by the controller 670 for assigning a SPGI for each packet based on the incoming port. As described above, the flow entries of some embodiments store the PGIs in a memory register before writing the PGIs to a header of the packet. However, unlike FIG. 2, the forwarding tables 630, 640, and 650 also include flow entries for assigning a destination PGI (DPGI). In some embodiments, the DPGI is assigned to the tunnel header based on the destination MAC or IP address of a packet.

The physical third view 603 illustrates a view of the physical network with flow entries for forwarding packets based on the assigned PGIs. The forwarding tables 630, 640, and 650 are each populated with different flow entries for forwarding packets based on the assigned SPGI and DPGI. As in the example of FIG. 2, each of the forwarding tables 630, 640, and 650 for the MFEs 1-3 stores the same records for forwarding a packet based on the SPGI of a packet. Logical port classification allows the network state for implementing the forwarding logic to remain largely constant. As new ports are added or removed, the MFEs simply need new flow entries to assign PGIs to the packets.

Figure 7:
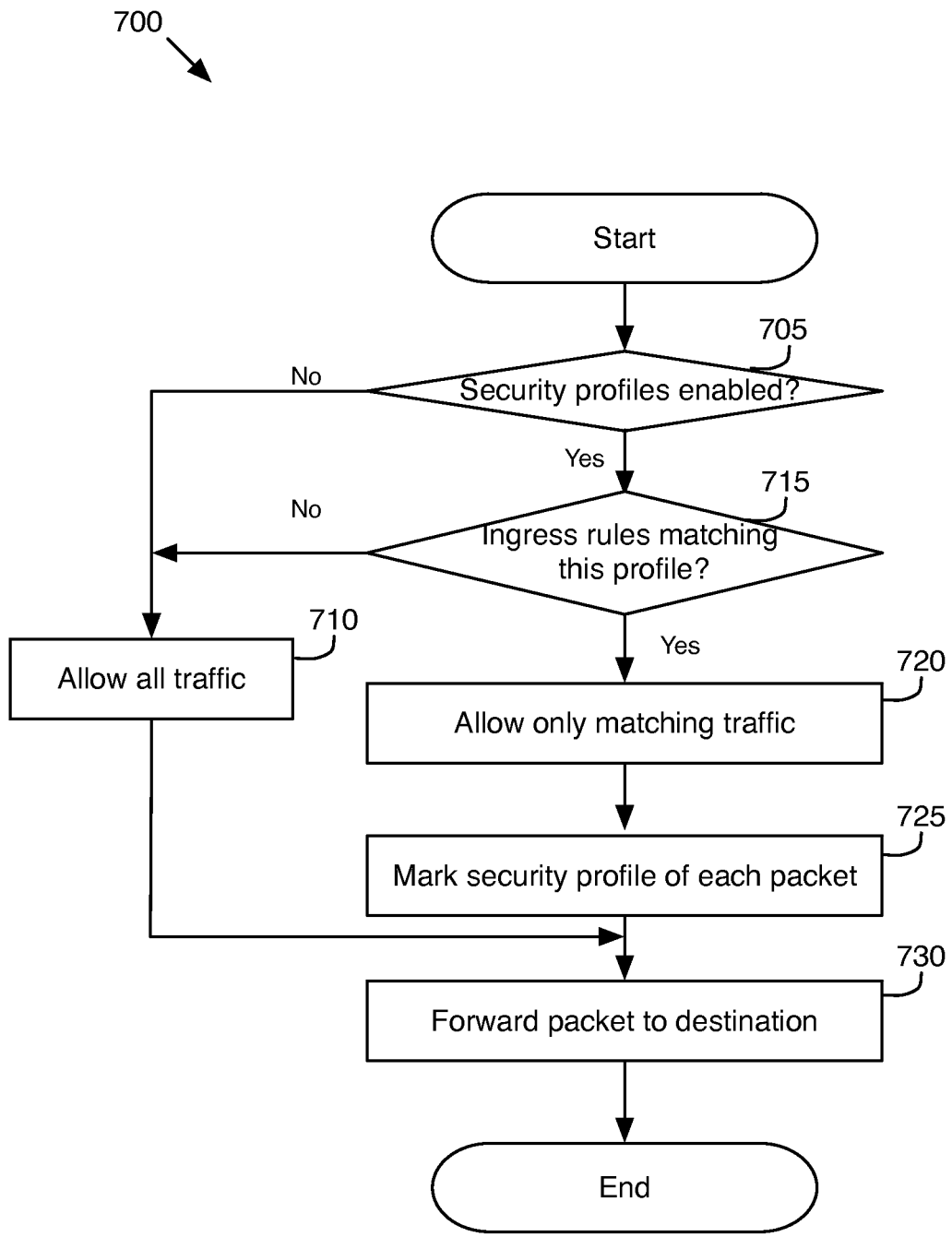
FIG. 7 conceptually illustrates a process of some embodiments for implementing ingress port security using logical port classifications.

FIG. 7 conceptually illustrates a process of some embodiments for implementing ingress port security using logical port classifications. In some embodiments, the process 700 is performed by a managed forwarding element based on a set of flow entries that are received from a controller of the network control system.

The process 700 determines (at 705) whether security profiles are enabled for the ingress port. When the process determines that security profiles are not enabled, the process 700 allows (at 710) all traffic and continues to operation 725 described below.

When the process determines that the security profiles are enabled, the process 700 determines (at 715) whether there are ingress rules that match the security profile for the particular port. When the process 700 determines (at 715) that there are no ingress rules that match the security profile for the particular port, the process allows (at 720) all traffic and continues to operation 725.

When the process 700 determines (at 715) that there are matching ingress rules, the process 700 allows (at 715) only matching traffic, dropping any traffic that does not match.

The process 700 marks (at 725) each packet according to the security profile (e.g., with the port group identifiers). The process 700 then forwards (at 730) the packet to the destination port. In some embodiments, the process 700 forwards (at 730) the packet using additional forwarding tables in a managed forwarding element to determine a destination port for the particular packet.

Figure 8:
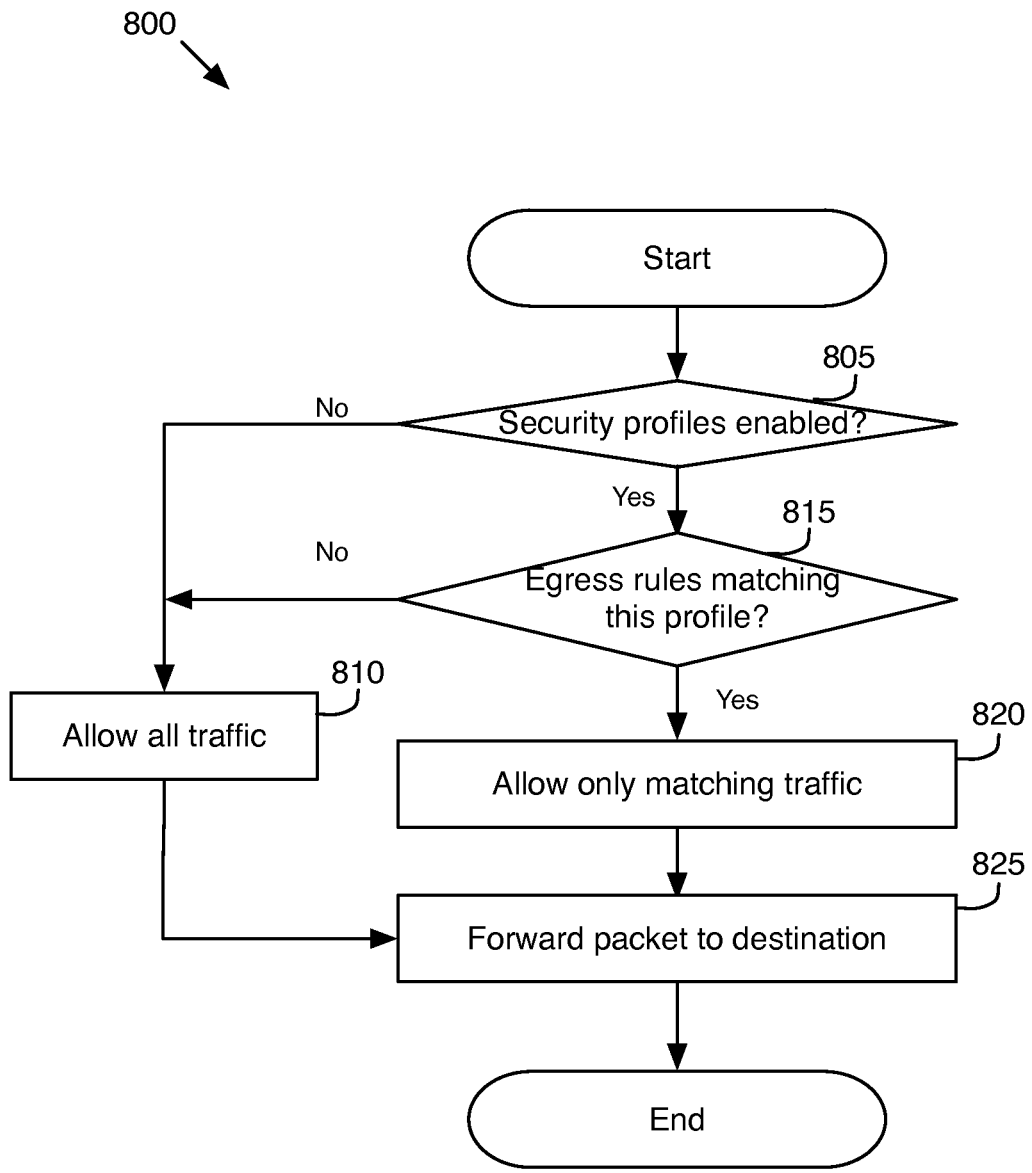
FIG. 8 conceptually illustrates a process of some embodiments for implementing egress port security using logical port classifications.

In addition to performing ingress port security, the network control system of some embodiments also performs egress port security. FIG. 8 conceptually illustrates a process of some embodiments for implementing egress port security using logical port classifications. Like process 700 of FIG. 7, the process 800 of some embodiments is performed by a managed forwarding element based on a set of flow entries that are received from a controller of the network control system.

The process 800 determines (at 805) whether security profiles are enabled for the egress port. When the process determines that security profiles are not enabled, the process 800 allows (at 810) all traffic and continues to operation 825 described below. When the process determines that the security profiles are enabled, the process 800 determines (at 815) whether there are egress rules that match the security profile for the particular port. When the process 800 determines (at 815) that there are no egress rules that match the security profile for the particular port, the process allows (at 810) all traffic and continues to operation 825.

When the process 800 determines (at 815) that there are matching egress rules, the process 800 allows (at 820) only matching traffic, dropping any traffic that does not match. If the security profile has an egress rule to allow traffic from specific source profile members, match the other fields and also the encoded bit. If traffic from group X is allowed, and this traffic is marked as being from group X member, allow it.

The process 800 then forwards (at 825) the packet to the destination port. In some embodiments, the process 800 forwards the packet using additional forwarding tables in a managed forwarding element to determine a destination port for the particular packet.

By using logical port classifications, rather than having O(n^2) performance where every destination logical port has a flow to allow network data from the IP address of each of the source members, the scale requirement is reduced to O(1) as only a single flow that matches on the encoded information about the source logical port's profile membership is necessary.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
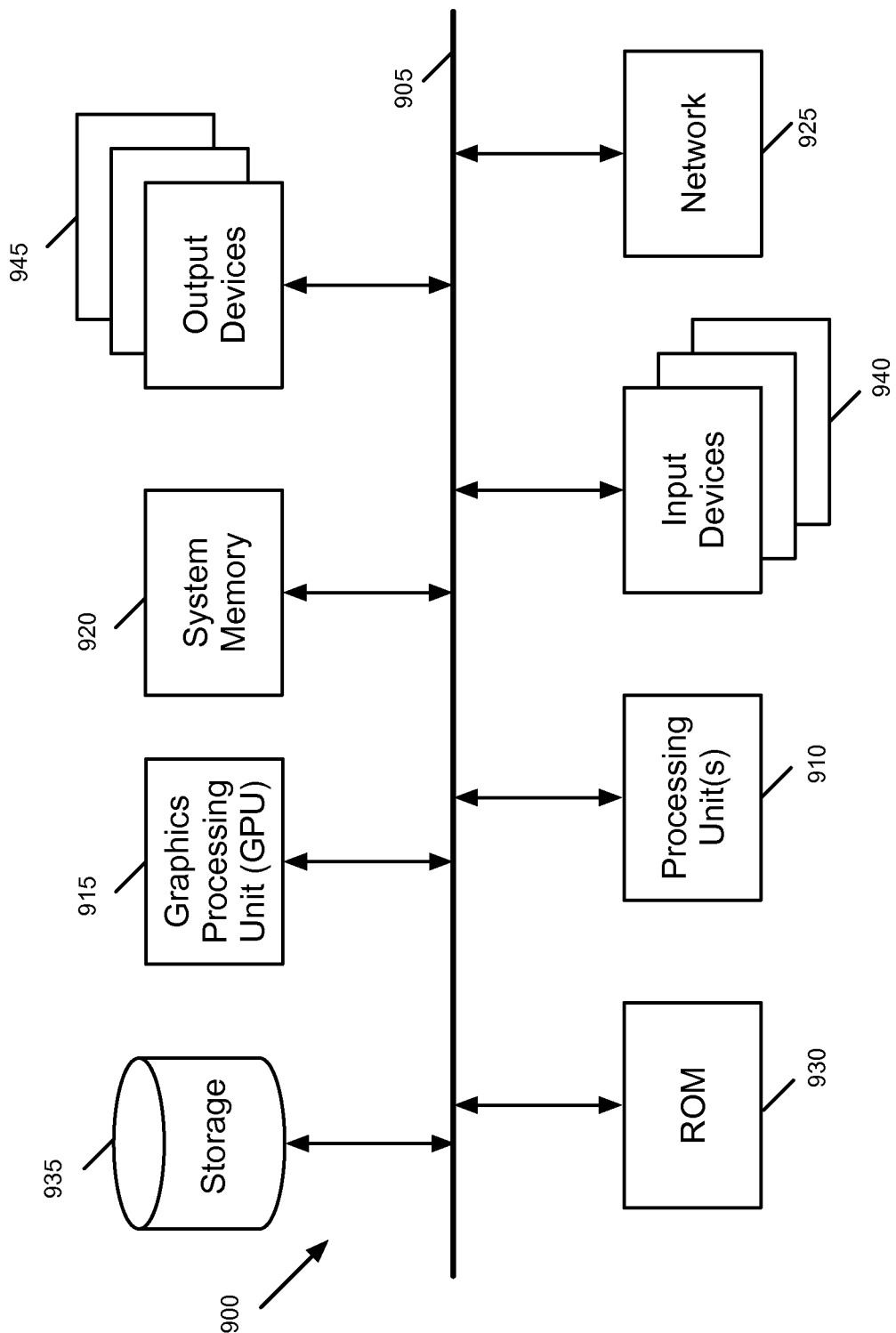
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 912.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 912. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 3, 7, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which a user provide logical datapath sets in terms of logical control plane data. In other embodiments, however, a user may provide logical datapath sets in terms of logical forwarding plane data. In addition, several embodiments were described above in which a controller instance provide physical control plane data to a forwarding element in order to manage the forwarding element. In other embodiments, however, the controller instance may provide the forwarding elements with physical forwarding plane data.

Furthermore, in several examples above, a user specifies one or more logic switches. In some embodiments, the user can provide physical switch configurations along with such logic switch configurations. Also, even though controller instances are described that in some embodiments are individually formed by several application layers that execute on one computing device, one of ordinary skill will realize that such instances are formed by dedicated computing devices or other machines in some embodiments that perform one or more layers of their operations. Thus, one of ordinary skill in the art would understand that the invention is not to be limited by the foregoing illustrative details. Thus, one of ordinary skill in the art would understand that the invention is not to be limited by the foregoing illustrative details.

What is claimed is:

1. A non-transitory machine readable medium storing a program for implementing a particular managed forwarding element (MFE) to forward packets in a network, the particular MFE implementing a logical forwarding element (LFE) along with a plurality of other MFEs, the program for execution by at least one processor, the program comprising sets of instructions for:
receiving a packet at a physical port of the particular MFE;
using a first identifier of the physical port to perform a first matching operation that identifies a first match-action rule specifying a second identifier identifying a logical group (LG);
using the LG second identifier to perform a second matching operation that identifies a second match-action rule specifying a first forwarding action to perform on the packet;
performing the first forwarding action on the packet; and
embedding the LG second identifier in a tunnel header that encapsulates the packet,
wherein another MFE uses the LG second identifier to perform a third matching operation for the packet in order to identify a third match-action rule specifying a second forwarding action to perform on the packet.

2. The non-transitory machine readable medium of claim 1, wherein the LG second identifier identifies a group of logical network element entities.

3. The non-transitory machine readable medium of claim 1, wherein the LG second identifier is a logical port group (LPG) identifier that identifies a group that includes a plurality of logical ports of the LFE.

4. The non-transitory machine readable medium of claim 1, wherein the LG second identifier is a source port group identifier (SPGI), the program further comprising a set of instructions for performing a third matching operation to identify a destination port group identifier (DPGI) to associate with the packet, wherein the second matching operation further uses the associated DPGI.

5. A non-transitory machine readable medium storing a program for implementing a particular managed forwarding element (MFE) to forward packets in a network, the particular MFE implementing a logical forwarding element (LFE) along with a plurality of other MFEs, the program for execution by at least one processor, the program comprising sets of instructions for:
receiving a packet at a physical port of the particular MFE;
using a first identifier of the physical port to perform a first matching operation that identifies a first match-action rule specifying a second identifier identifying a logical port group (LPG) that includes a plurality of logical ports of the LFE, wherein each logical port of the LFE maps to at least one physical port of one MFE, wherein at least two different LPG identifiers are associated with at least two different sets of logical ports of the LFE;
using the LPG second identifier to perform a second matching operation that identifies a second match-action rule specifying a forwarding action to perform on the packet; and
performing the specified forwarding action on the packet.

6. The non-transitory machine readable medium of claim 5, wherein the forwarding action specified by the second match-action rule specifies a destination in the network, wherein performing the specified forwarding action on the packet comprises forwarding the packet to the specified destination.

7. The non-transitory machine readable medium of claim 5, wherein the program further comprises a set of instructions for embedding the LG second identifier in a tunnel header that encapsulates the packet, wherein another MFE uses the LG second identifier to perform a third matching operation for the packet in order to identify a third match-action rule specifying another forwarding action to perform on the packet.

8. A non-transitory machine readable medium storing a program for implementing a particular managed forwarding element (MFE) to forward packets in a network, the particular MFE implementing a logical forwarding element (LFE) along with a plurality of other MFEs, the program for execution by at least one processor, the program comprising sets of instructions for:

receiving a packet at a physical port of the particular MFE;

using a first identifier of the physical port to perform a first matching operation that identifies a first match-action rule specifying a second identifier identifying a logical group (LG);

using the LG second identifier to perform a second matching operation that identifies a second match-action rule specifying a port-isolation action to perform on the packet that determines that the packet should be dropped when the packet is associated with a logical port that is isolated from the logical port to which the packet is destined; and performing the specified port-isolation action on the packet.

9. The non-transitory machine readable medium of claim 8, wherein the LG second identifier is a logical port group (LPG) identifier that identifies a group that includes a plurality of logical ports of the LFE.

10. The non-transitory machine readable medium of claim 8, wherein the program further comprises a set of instructions for embedding the LG second identifier in a tunnel header that encapsulates the packet, wherein another MFE uses the LG second identifier to perform a third matching operation for the packet in order to identify a third match-action rule specifying another forwarding action to perform on the packet.

11. A non-transitory machine readable medium storing a program for implementing a particular managed forwarding element (MFE) to forward packets in a network, the particular MFE implementing a logical forwarding element (LFE) along with a plurality of other MFEs, the program for execution by at least one processor, the program comprising sets of instructions for:

receiving a packet at a physical port of the particular MFE;

using a first identifier of the physical port to perform a first matching operation that identifies a first match-action rule specifying a second identifier identifying a logical group (LG);

using the LG second identifier to perform a second matching operation that identifies a second match-action rule specifying a port-security decision to perform on the packet that determines whether the packet should be forwarded or dropped when a set of attributes of the packet matches a rule qualifier of the second match-action rule; and performing the specified port-security decision on the packet.

12. The non-transitory machine readable medium of claim 11, wherein the rule qualifier includes the LG second identifier.

13. The non-transitory machine readable medium of claim 11, wherein the LG second identifier is a logical port group (LPG) identifier that identifies a group that includes a plurality of logical ports of the LFE.

14. A non-transitory machine readable medium storing a program for implementing a first managed forwarding element (MFE) to forward packets in a network, the first MFE implementing a logical forwarding element (LFE) along with a plurality of other MFEs, the program for execution by at least one processor, the program comprising sets of instructions for:

receiving a packet at a physical port of the first MFE;

using a first identifier of the physical port to perform a first matching operation that identifies a first match-action rule specifying a second identifier identifying a logical group (LG);

embedding the LG second identifier in a tunnel header that encapsulates the packet, wherein a second MFE uses the LG second identifier to perform a second matching operation that identifies a second match-action rule specifying a port-isolation action to perform on the packet that determines that the packet should be dropped when the packet is associated with a logical port that is isolated from the logical port to which the packet is destined; and forwarding the encapsulated packet to the second MFE.

15. The non-transitory machine readable medium of claim 14, wherein the LG second identifier identifies a group of logical network element entities.

16. The non-transitory machine readable medium of claim 14, wherein the LG second identifier is a logical port group (LPG) identifier that identifies a group that includes a plurality of logical ports of the LFE.

17. A non-transitory machine readable medium storing a program for implementing a particular managed forwarding element (MFE) to forward packets in a network, the particular MFE implementing a logical forwarding element (LFE) along with a plurality of other MFEs, the program for execution by at least one processor, the program comprising sets of instructions for:

receiving a packet at a physical port of the particular MFE;

using a first identifier of the physical port to perform a first matching operation that identifies a first match-action rule specifying a second identifier identifying a logical port group (LPG) that includes a plurality of logical ports of the LFE, wherein each logical port of the LFE maps to at least one physical port of one MFE, wherein at least two different LPG identifiers are associated with at least two different sets of logical ports of the LFE;

embedding the LPG second identifier in a tunnel header that encapsulates the packet, wherein a second MFE uses the LPG second identifier to perform a second matching operation that identifies a second match-action rule specifying a forwarding action to perform on the packet; and forwarding the encapsulated packet to the second MFE.

18. The non-transitory machine readable medium of claim 17, wherein the forwarding action specified by the second match-action rule is a port-isolation action that determines that the packet should be dropped when the packet is associated with a logical port that is isolated from the logical port to which the packet is destined.

19. The non-transitory machine readable medium of claim 17, wherein the forwarding action specified by the second match-action rule specifies a destination in the network, wherein the second MFE forwards the packet to the specified destination.

20. The non-transitory machine readable medium of claim 17, wherein the second identifier is a source port group identifier (SPGI), the program further comprising a set of instructions for performing a third matching operation to identify a destination port group identifier (DPGI) to associate with the packet, wherein the second matching operation further uses the associated DPGI.

21. A non-transitory machine readable medium storing a program for implementing a particular managed forwarding element (MFE) to forward packets in a network, the particular MFE implementing a logical forwarding element (LFE) along with a plurality of other MFEs, the program for execution by at least one processor, the program comprising sets of instructions for:

receiving a packet at a physical port of the particular MFE;

using a first identifier of the physical port to perform a first matching operation that identifies a first match-action rule specifying a second identifier identifying a logical group (LG);

embedding the LG second identifier in a tunnel header that encapsulates the packet, wherein a second MFE uses the LG second identifier to perform a second matching operation that identifies a second match-action rule specifying a port-security decision that determines whether the packet should be forwarded or dropped when a set of attributes of the packet matches a rule qualifier of the second match-action rule; and forwarding the encapsulated packet to the second MFE.

22. The non-transitory machine readable medium of claim 21, wherein the rule qualifier includes the LG second identifier.

23. The non-transitory machine readable medium of claim 21, wherein the LG second identifier is a logical port group (LPG) identifier that identifies a group that includes a plurality of logical ports of the LFE.

* * * * *